3,059,056
STEREOPHONIC SOUND SIGNAL RECEIVERS

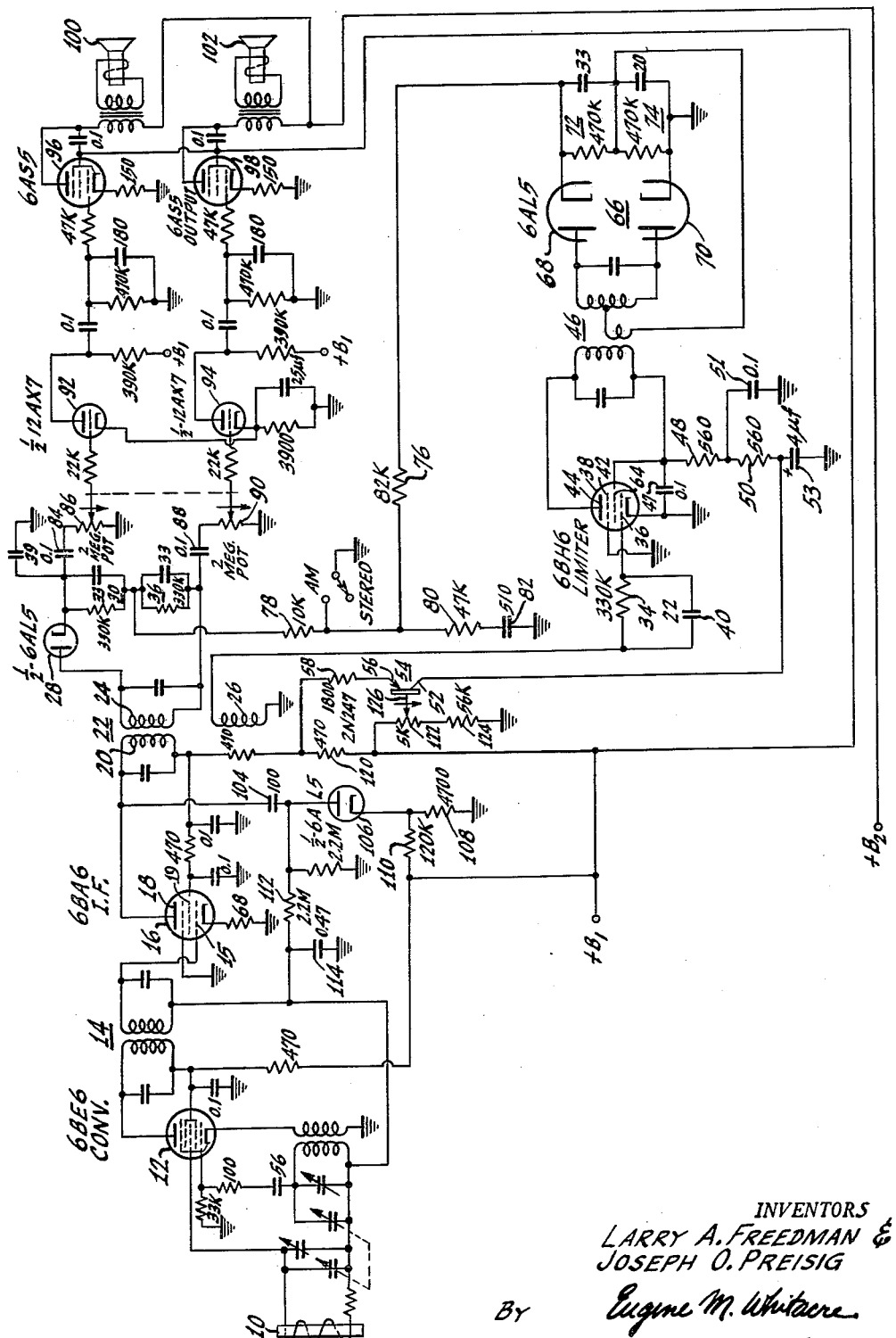

Larry A. Freedman, East Brunswick, and Joseph O. Preisig, Trenton, N.J., assignors to Radio Corporation of America, a corporation of Delaware
Filed Feb. 4, 1960, Ser. No. 6,653
7 Claims. (Cl. 179—15)

This invention relates to stereophonic radio receivers, and more particularly to such receivers adapted for the reception of stereophonic signal information which is carried as amplitude and angle modulation of a single carrier wave.

One method of modulating a pair of stereophonically related signals on a single carrier wave is disclosed in a United States Patent Application filed for Avins and Holt, Serial No. 799,680, filed March 16, 1959 and entitled Multiplicative Stereophonic Sound Signalling System. Broadly, the aforementioned application discloses, inter alia, a method of transmitting and receiving information relative to a pair of stereophonically related signals, that utilizes a pair of stereophonic signals, A and B, to modulate a single carrier wave, such that the sum of the A and B signals $(A+B)$ amplitude modulates the carrier wave, and the difference of the two signals $(A-B)$ angle modulates the carrier wave. A receiver for such a modulated carrier wave is also disclosed in said application and includes circuits for demodulating both the amplitude modulation component and the angle modulation component, to derive the $(A+B)$ and $(A-B)$ signals, respectively. To obtain the individual A and B signals, the $(A+B)$ and $(A-B)$ signals are added and subtracted in a matrixing circuit. It is apparent that if the $(A+B)$ and $(A-B)$ signals that are recovered by detection at the receiver do not bear the same amplitude ratio as the $(A+B)$ and $(A-B)$ signals utilized to modulate the transmitter, the resultant signals that are reproduced by the receiver will not provide the proper stereophonic effect. It is also proposed in the above-mentioned application that the proper ratio be maintained between the detected $(A+B)$ and $(A-B)$ signals at the receiver by "tracking" between the separate angle modulation and amplitude modulation channels of the stereophonic receiver, and certain circuitry is shown in the aforesaid application for accomplishing this purpose.

It is an object of this invention to provide an improved tracking circuit between the angle and amplitude modulation channels of a stereophonic signal receiver which is adapted to receive a carrier wave amplitude and angle modulated by a pair of stereophonically related signals.

It is a further object of this invention to provide a tracking circuit between the amplitude modulation and angle modulation channels of a stereophonic receiver of the type described which is simple and economical of construction and reliable and efficient in operation.

These and other objects of the invention are accomplished, briefly, by providing separate amplitude and angle modulation channels for the receiver in which the angle modulation channel includes a limiter circuit followed by an angle modulation detector circuit. In order to vary the amplitude of the detected signal from the angle modulation detector as the average amplitude of the amplitude modulation output varies due to variation in the strength of the received wave, the operating voltages for a limiter circuit preceding the angle modulation detector are supplied from a source of operating potential through a transistor. The impedance of the transistor is varied in accordance with the signal strength of the received wave to vary the amplitude of the angle modulated wave applied from the limiter to the angle modulation detector and thus vary the amplitude of detected angle modulation signal.

The invention may be better understood however when the following description is read in connection with the accompanying drawing in which the sole FIGURE of the drawings is a schematic circuit diagram of a stereophonic signal receiver having a tracking circuit between the amplitude and angle modulation channels in accordance with the invention.

The receiver circuit shown in the drawing has tube type and component values listed thereon. All capacitor values greater than one are in micromicrofarads unless otherwise indicated, and all resistance values are in ohms. The values of the components shown are illustrative only, and are not to be taken as limiting the values that may be used in accordance with the invention.

Referring now to the drawings, the stereophonic receiver illustrated includes a ferrite loop antenna 10 to intercept and supply a stereophonically modulated wave to a converter tube 12. The wave which is intercepted by the antenna 10 may be modulated in accordance with the disclosure in the aforementioned Avins and Holt patent application, Serial No. 799,680. The converter tube 12 and its associated circuitry develop an intermediate frequency (IF) wave which is applied through a first IF transformer 14 to the control grid 15 of an IF amplifier tube 16. The amplified IF wave appearing at the anode 18 of the IF amplifier tube 16 is applied to the primary winding 20 of a second IF transformer 22 which includes a secondary winding 24 and a tertiary winding 26.

The IF wave developed across the secondary winding 24 is applied to an amplitude modulation envelope detector circuit which comprises a diode 28 connected in series with first and second envelope detector load circuits 30 and 36 across the secondary winding 24.

The tertiary winding 26 has one end thereof connected to the ground for the receiver and the other end connected through a parallel connected resistor 34 and capacitor 40 to the control grid 36 of a limiter tube 38, which is illustrated as a pentode. The values of the resistor 34 and capacitor 40 are selected so that the tube 38 operates as a grid biased limiter. More particularly the value of resistor 34 and the capacitor 40 are selected so that their time constant is long with respect to the period of the IF wave, and a grid leak bias is developed across the resistor 34. The suppressor grid 42 of the tube 38 is connected to ground for the receiver. The anode 44 and the screen 64 of the tube 38 are connected through a pair of serially connected decoupling resistors 48 and 50, and their associated capacitors 47 and 51, to the collector electrode 52 of a transistor 54. As will be more fully explained hereafter, the operating voltages for the limiter tube 38 are supplied through the transistor 54.

The limited IF wave that is derived from the anode of the limiter tube 38 is applied to the primary winding of a discriminator transformer 46 which drives a conventional, balanced angle modulation detector 66. The detector 66 includes a pair of diodes 68 and 70 with their anodes connected to opposite ends of the secondary winding of the discriminator transformer 46. The load circuit for the diodes 68 and 70 comprises a pair of resistor-capacitor networks 72 and 74 connected in series between the cathodes of the diodes 68 and 70. Note that on the drawing the values of the capacitors in the resistor-capacitor networks 72 and 74 are unequal in order to balance the detected output signal because of unbalance between the opposite sides of the detector and ground. One end of the load circuit is connected to ground and the other end is connected through a de-emphasis resistor 76, serially connected with an IF isolating resistor 78, to the junction of the envelope detector load circuits 30 and 36. A serially connected de-emphasis capacitor 82 and a second de-emphasis resistor 80 are connected between ground and the junction of the de-emphasis resistors 76 and the isolating resistor 78. The purpose of the second de-emphasis resistor 80 is to limit the amount of de-emphasis at the extreme high audio frequencies.

As has previously been explained, the $(A-B)$ signal is detected from the angle modulation of the carrier wave, and the $(A+B)$ signal is detected from the amplitude modulation of the carrier wave. The matrixing of these two detected signals is accomplished by the interconnection of the angle and amplitude modulation detectors. A first potentiometer 86 is connected in series with a first coupling capacitor 84 between ground and one end of the first envelope detector load circuit 30. The signal available across the first potentiometer 86 is thus the sum of $+(A-B)$ (the de-emphasized angle modulation detector output appearing across the de-emphasis resistor 80 and capacitor 82) and $+(A+B)$ (the amplitude modulation detector output appearing across the first load circuit 30), which is equal to $+2A$. In like manner a second potentiometer 90 is connected in series with a second coupling capacitor 88 between ground and one end of the second load circuit 36. The signal available across the second potentiometer is thus the sum of $+(A-B)$ (the de-emphasized angle modulation detection output) and $-(A+B)$ (the amplitude modulation detection output across the second load circuit 36), which is equal to $-2B$. The A and B signals are individually applied from the potentiometers 86 and 90 through a pair of audio amplifiers 92 and 94 and a pair of power amplifiers 96 and 98 to left and right loudspeakers 100 and 102, respectively. The correct loudspeaker phasing is obtained by reversing the polarity of one of the output transforming windings driving the loudspeakers 100 and 102.

It will be noted that in the receiver thus described that the antenna 10, the converter tube 12, the IF amplifier tube 16, the audio amplifier tubes 94 and 92, the audio power amplifiers 96 and 98, and loudspeakers 100 and 102 may be of well known design.

Automatic gain control for the receiver is derived from the IF wave available at the anode 18 of the IF amplifier 16. The IF wave at the anode 18 is applied through a capacitor 104 to the anode of an AGC diode 106 whose cathode is connected to ground through a resistor 108. The AGC rectifier cathode is also connected to the source of operating potential, $+B1$, through a large resistor 110. The resistor 110 in series with the resistor 108 serves as a voltage divider network to provide a small positive voltage on the cathode of the AGC rectifier 106 and thus supply a delay voltage to the AGC circuit, since the anode of the AGC rectifier 106 must be driven positive by the IF wave by an amount that exceeds the positive voltage on the cathode before AGC voltage is developed. The circuit of the AGC rectifier 106 is of known design and, as is known, an AGC voltage negative with respect to ground for the receiver is developed at the anode of the AGC rectifier 106 and applied through a resistor 112 to the control grid 15 of the IF amplifier tube 16 and to the third grid of the converter tube 12. A capacitor 114 is connected from the end of the resistor 112 remote from the anode of the AGC rectifier 106 to ground to provide a signal frequency and oscillator frequency return path for tube 12 and an IF return path for the input circuit of tube 16. The resistor 112 and the capacitor 114 serve likewise as the AGC filter.

The angle modulation detector 66 previously noted is preceded by a limiter tube 38 and its associated circuitry. If the limiter circuit were of the static type, such as may be used in a standard frequency modulation receiver, its output wave amplitude would be maintained relatively constant over a wide range of signal strengths of the received wave that is intercepted by the antenna 10. Such action, however, is not acceptable in a stereophonic receiver for receiving a wave modulated in amplitude and angle by a pair of stereophonically related signals, since if the signal strength of the received wave varies, the amplitude of the detected amplitude modulation output also varies, but, if a static limiter were used in the angle modulation channel, the detected angle modulation output would not vary. Thus the matrixing (adding and subtracting) of the detected amplitude modulation $(A+B)$ and angle modulation signals $(A-B)$ would not result in the correct ratio between the two to provide the correct A and B signals that must be derived to result in proper stereophonic sound reproduction. Provision must, therefore, be made to vary the amplitude of the detected output signal from the angle modulation detector 66 in accordance with the signal strength of the received wave.

In accordance with the invention, the limited wave derived from the circuit output of the limiter tube 38 is varied in amplitude in accordance with the signal strength of the received wave by varying the operating voltages applied to the screen 64 and the anode 44 of the limiter tube 38. This action is accomplished by supplying these operating voltages to the tube 38 through the collector-to-emitter circuit of the transistor 54. Specifically, the second decoupling resistor 50 in the screen-anode supply circuit of the limiter tube 38 is connected to the collector electrode 52 of the transistor 54. The collector electrode 52 is bypassed to ground for all signal frequencies by a capacitor 53. The emitter electrode 56 of the transistor is connected through an emitter resistor 58 to a control resistor 120 connected between the source of operating potential, $+B1$, and the anode 18 and screen 19 of the IF amplifier tube 16. As is known, a remote cutoff tube is generally used as the IF amplifier tube in standard radio receivers so that AGC voltage can be applied to the tube to vary its gain in a manner to maintain the output of the envelope detector within reasonable limits. As the AGC voltage becomes larger in amplitude (indicating an increase in signal strength) the IF amplifier tube 16 is biased to produce less amplification of the IF wave. This action serves not only to reduce the amplitude of the IF wave at the anode 18 of the tube 16, but also to reduce the average cathode current that flows through the tube 16. Therefore, on strong signals the cathode current of the IF amplifier tube 16 is less than the cathode current of the tube 16 on weaker signals.

The cathode current of the tube 16 flowing through the control resistor 120 is thus a measure of the strength of the wave being amplified by the IF amplifier tube 16, and the voltage drop across this resistor may be used to control the limiting level of the limiter tube 38. As has been previously explained, one end terminal of the control resistor 120 is connected through the emitter resistor 58 to the emitter 56 of the transistor 54. The other terminal of the control resistor 120 is connected to the source of operating potential, $+B1$, and to ground for the receiver through a potentiometer 122 in series with a bleeder resistor 124. The base electrode 126 of the transistor 54 is connected to a variable tap on the potentiometer 122. By means of these connections the voltage appearing across the control resistor 120 is applied between the base 126 and emitter 56 of the transistor 54.

In operation, assume that a wave of high signal strength is being received. A relatively large AGC voltage is developed and the IF amplifier tube 16 is thus biased by the AGC voltage so that little cathode current is flowing. Thus, only a small voltage drop exists across the resistor 120. This small voltage drop appears between emitter 56 and base 126 of the transistor 54, and, in conjunction with the fixed bias voltage that appears on the base 126 from the tap on the potentiometer 122, forward biases the transistor 54 so that the collector current is nearly in saturation and the collector-to-emiter impedance is relatively low. Since the operating voltages for the screen 64 and anode 44 of the limiter tube 38 are supplied from source of operating potential, $+B1$, through the collector-to-emitter path of the transistor 54, substantially the full value of the operating voltage, $+B1$, is applied to the screen 64 and anode 44 of the limiter tube 38. The magnitude of the emission or discharge of electrons from the cathode of the limiter tube 38 is determined, inter alia, by the anode 44 and screen 64 operating voltage, and the magnitude of the electron discharge, in turn, determines the amplitude of the output wave from the limiter 38. Thus, nearly full operating voltage on the anode 44 and screen 64 result in a large value of wave amplitude being applied to the angle modulation detector 66. The detector 66 is of the type in which the output signal is proportional to the product of the amplitude and angle modulation of the wave applied thereto. Such a detector is disclosed in Patent 2,121,103 issued to S. W. Seeley and this type is illustrated as detector 66 in the drawing. Thus, the strong received wave produces, in the manner described, a large amplitude output wave from the limiter 38 and a consequent large amplitude detected output signal from the detector 66 to correspond or "track" with the large detected output signal from the envelope detector 28 as a result of the strong received wave.

Conversely, as the strength of the received wave decreases, the conduction in the IF amplifier tube 16 increases in response to the decreased AGC voltage. A larger voltage drop than previously described therefore appears across the control resistor 120 and reduces the forward bias on the transistor 54 causing its collector-to-emitter conduction to be reduced, thus reducing the voltage applied to the screen 64 and anode 44 of the limiter tube 38 to lower the amplitude of its wave output. As a consequence, the detected output signal from the detector 66 is reduced. For very weak signals the transistor 54 is essentially cut off, providing little, if any, voltage to the anode 44 and screen 64, which will result in little, if any, output signal from the angle modulation detector 66.

The character and extent of the variation of collector-to-emitter of the transistor 54 in response to signals appearing across the control resistor 120 may be controlled by various means to provide the desired variation in output level of the limiter 38. For example, the bias on the base 126 may be set to produce a delay in the operation of the transistor 54, or the values of the control resistor 120 and the emitter resistor 58 may be adjusted to control the character of the response of the transistor 54.

It will be appreciated that the variations in the amplitude of the received wave that are to be compensated for by the invention are not those variations in wave amplitude which are indicative of the amplitude modulation of the wave, but only those variations which occur at a rate lower than the lowest frequency signal used to amplitude modulate the wave.

It will thus be seen that a circuit constructed in accordance with this invention provides variation in the output signal of the angle modulation detector in a stereophonic receiver of the type described to match the output of the envelope detector as the signal strength of the received wave varies and serves to prevent serious matrixing errors which may otherwise arise.

What is claimed is:

1. In a receiver for the reception of a wave amplitude modulated by a first signal and angle modulated by a second signal and subject to undesired amplitude variations occurring to a rate below the lowest rate of said first signal, an angle modulation detector circuit for said wave including in combination: a source of said modulated wave, an angle modulation detector having a detected output signal responsive by both the angle modulation on and the amplitude of an input wave impressed thereon, a limiter device of the type providing an output wave of amplitude substantially independent of the variations on an input wave supplied thereto but responsive to the operating potential supplied thereto, a control circuit including a transistor having an input and output circuit, means including said limiter device coupling said source to said detector, means coupling the input circuit of said control circuit to said source, a source of operating potential, and means coupling the output circuit of said control circuit between said source of operating potential and said limiter device to vary the operating potential supplied to said device in accordance with the undesired amplitude variations of said wave.

2. A stereophonic receiver circuit including in combination: a source of waves amplitude modulated and angle modulated by stereophonically related signals and subject to undesired variations in amplitude, an amplifier for said waves including an electron discharge device having an input/output transfer characteristic and an electron discharge of magnitude determined by a control potential, means coupling said amplifier to said source, a rectifier coupled to said amplifier to develop a control potential substantially independent of the signal modulations on the waves but representative of the undesired variations in wave amplitude, means for applying said control potential to said amplifier to control the gain thereof, an angle modulation detector coupled to said amplifier, a transistor having input and output circuits, means coupling said input circuit to said amplifier and said output circuit to said detector for controlling the input-output signal amplitude translation characteristic of said detector as a function of said control voltage.

3. In a receiver for the reception of stereophonic signals which are transmitted as amplitude and angle modulations of a carrier wave, which wave is subject to undesired amplitude variations occasioned by variations in the propagation path between the transmitter and the receiver, a tracking limiter circuit for the angle modulation detection circuit of the receiver including in combination: a limiter device of the type providing an output substantially independent of the input supplied to the device, but responsive to an operating potential supplied to the device, a transistor control circuit having an input circuit, means impressing a signal representative of the said undesired amplitude variation upon said input circuit, and means coupling said control circuit to said limiter device for determining the operating potential supplied thereto to render the output of the angle modulation detection circuit responsive to the undesired amplitude variations.

4. In a receiver for the reception of stereophonic signals transmitted as amplitude and angle modulation of a carrier wave, which wave is subject to undesired variations in strength, said receiver including an amplitude modulation channel including an envelope detector and an angle modulation channel including an angle modulation detector, said angle modulation detector responsive to the angle modulation of and the amplitude of a wave applied thereto, a tracking circuit for said angle modulation channel comprising in combination, a source of carrier waves modulated in angle and amplitude, a limiter circuit including an electron discharge device having an output wave the amplitude of which wave is dependent on the value of the operating potentials applied to said device, means connecting said limiter circuit between said source of carrier waves and the angle modulation detector for applying limited waves to said detector, a source of operating potential, a transistor device, means for connecting said transistor between said source of operating potential and said electron discharge device, and means responsive to the strength of the received carrier wave connected to said transistor for varying the impedance of said transistor in accordance with the strength of said wave.

5. In a stereophonic signal receiver for radio frequency carrier waves modulated in angle and amplitude in accordance with stereophonically related signals, and which receiver includes separate signal channels for demodulating the angle and amplitude modulation components from such a received radio frequency carrier wave, the combination comprising a limiter stage in said angle modulation demodulating channel, voltage responsive impedance means for connecting said limiter stage to a source of operating potential, and means for controlling the impedance of said voltage responsive impedance means as a function of the average level of a received radio frequency carrier wave.

6. In a stereophonic signal receiver for radio frequency carrier waves modulated in angle and amplitude in accordance with stereophonically related signals, and which receiver includes separate signal channels for demodulating the angle and amplitude modulation components from such a received radio frequency carrier wave, the combination comprising a limiter stage in said angle modulation demodulating channel, means providing a source of operating potential for said limiter stage, a transistor having base, emitter and collector electrodes, means connecting the current path between the emitter and collector electrodes of said transistor between said limiter stage and said source of operating potential, means for deriving a control voltage which varies as a function of the average level of a received radio frequency carrier wave, and means for applying said control voltage between the base and emitter electrodes of said transistor.

7. In a stereophonic signal receiver for radio frequency carrier waves modulated in angle and amplitude in accordance with stereophonically related signals, and which receiver includes separate signal channels for demodulating the angle and amplitude modulation components from such a received radio frequency carrier wave, the combination comprising a limiter stage in said angle modulation demodulating channel, a source of operating potential for said limiter stage, and means for maintaining the signal output levels from the angle and amplitude modulation demodulating channels in predetermined tracking relation including voltage responsive impedance means connecting said limiter stage to said source of operating potential, the impedance of said voltage responsive impedance means being controlled as a function of the average level of a received radio frequency carrier wave.

References Cited in the file of this patent

UNITED STATES PATENTS

| | | |
|---|---|---|
| 2,250,862 | Farrington | July 29, 1941 |
| 2,357,975 | Roberts | Sept. 12, 1944 |
| 2,420,248 | Koch | May 6, 1947 |
| 2,835,795 | Kroger | May 20, 1958 |

FOREIGN PATENTS

| | | |
|---|---|---|
| 540,185 | Great Britain | Oct. 8, 1941 |